United States Patent
Suzuki et al.

(10) Patent No.: US 12,001,623 B2
(45) Date of Patent: Jun. 4, 2024

(54) DECORATIVE SHEET AND ELECTROSTATIC INPUT DEVICE

(71) Applicant: ALPS ALPINE CO., LTD., Tokyo (JP)

(72) Inventors: Kenta Suzuki, Miyagi (JP); Masahito Watanabe, Miyagi (JP); Hiroshi Kobayashi, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 41 days.

(21) Appl. No.: 17/645,810

(22) Filed: Dec. 23, 2021

(65) Prior Publication Data

US 2022/0113827 A1 Apr. 14, 2022

Related U.S. Application Data (63) Continuation of application No. PCT/JP2020/010564, filed on Mar. 11, 2020.

(30) Foreign Application Priority Data

Jul. 1, 2019 (JP) .................................. 2019-123193

(51) Int. Cl.
*G06F 3/041* (2006.01)
*B32B 7/12* (2006.01)
(Continued)

(52) U.S. Cl.
CPC .............. *G06F 3/0412* (2013.01); *B32B 7/12* (2013.01); *B32B 27/08* (2013.01); *B44F 9/02* (2013.01);
(Continued)

(58) Field of Classification Search
CPC ........ G06F 3/0412; G06F 3/016; G06F 3/044; B32B 7/12; B32B 27/08;
(Continued)

(56) References Cited

U.S. PATENT DOCUMENTS

| 2010/0166997 | A1 | 7/2010 | Chisaka et al. |
| 2016/0082881 | A1* | 3/2016 | Yamato ................... B29C 45/00 362/511 |

(Continued)

FOREIGN PATENT DOCUMENTS

| JP | H10-264346 | 10/1998 |
| JP | 2000-103198 | 4/2000 |

(Continued)

OTHER PUBLICATIONS

Translation for JP-2009064761-A, Kuwabara. (Year: 2009).*

(Continued)

*Primary Examiner* — Nathan L Van Sell
(74) *Attorney, Agent, or Firm* — IPUSA, PLLC.

(57) ABSTRACT

A decorative sheet is a decorative sheet to be attached to a surface of a decoration target part, and includes a base film layer formed of a base film having a sheet shape, a decorative layer representing a decorative pattern, a light shield layer that is provided on a back side position with respect to the decorative layer and that includes a light transmitting portion having a predetermined shape, and a medium color layer formed between the decorative layer and the light shield layer.

10 Claims, 5 Drawing Sheets

(51) Int. Cl.
  *B32B 27/08*  (2006.01)
  *B44F 9/02*  (2006.01)
  *G06F 3/01*  (2006.01)

(52) U.S. Cl.
  CPC . *B32B 2307/4023* (2013.01); *B32B 2307/412* (2013.01); *B32B 2451/00* (2013.01); *G06F 3/016* (2013.01)

(58) Field of Classification Search
  CPC ...... B32B 2307/4023; B32B 2307/412; B32B 2451/00; B32B 33/00; B32B 38/18; B44F 9/02; B44F 1/06; B44C 1/105; B44C 3/025; G09F 13/04
  See application file for complete search history.

(56) References Cited

U.S. PATENT DOCUMENTS

| | | | |
|---|---|---|---|
| 2018/0204493 A1 | 7/2018 | Sakamaki et al. | |
| 2018/0267227 A1 | 9/2018 | Takata et al. | |
| 2020/0262744 A1 | 8/2020 | Fenton et al. | |

FOREIGN PATENT DOCUMENTS

| | | |
|---|---|---|
| JP | 2000-117927 | 4/2000 |
| JP | 2000-141549 | 5/2000 |
| JP | 2001-277409 | 10/2001 |
| JP | 2001-347539 | 12/2001 |
| JP | 2002-210908 | 7/2002 |
| JP | 2004-074442 | 3/2004 |
| JP | 2005-010251 | 1/2005 |
| JP | 2005-319585 | 11/2005 |
| JP | 2007-206577 | 8/2007 |
| JP | 2007-253370 | 10/2007 |
| JP | 2008-087267 | 4/2008 |
| JP | 2008-183830 | 8/2008 |
| JP | 2009-064761 | 3/2009 |
| JP | 2009-223135 | 10/2009 |
| JP | 2009-295365 | 12/2009 |
| JP | 2010-000228 | 1/2010 |
| JP | 2012-223922 | 11/2012 |
| JP | 2013-220549 | 10/2013 |
| JP | 2014-085902 | 5/2014 |
| JP | 2014-231310 | 12/2014 |
| JP | 2015-182301 | 10/2015 |
| JP | 2015-193244 | 11/2015 |
| JP | 2016-031696 | 3/2016 |
| JP | 2017-024318 | 2/2017 |
| JP | 2017-090814 | 5/2017 |
| JP | 2017-165030 | 9/2017 |
| JP | 2018-155819 | 10/2018 |
| JP | 2018-189915 | 11/2018 |
| JP | 2019-084821 | 6/2019 |
| JP | 2020-533703 | 11/2020 |
| WO | 2019/031061 | 2/2019 |
| WO | 2019055469 | 3/2019 |

OTHER PUBLICATIONS

Translation for CN-206544507-U, Chen. (Year: 2017).*
Translation for JP-2017102016-A, Ikumi, (Year: 2017).*
Japanese Notice of Opposition for 2020-168574 dated Feb. 6, 2023.
International Search Report for PCT/JP2020/010564 dated Jun. 16, 2020.
Japanese Office Action for 2020-547239 dated Jan. 19, 2021.
Japanese Office Action for 2020-168574 dated Jul. 6, 2021.
Japanese Written Opinion for 2020-168574 dated Sep. 13, 2023.
Japanese Notice of Decision on the Objection for 2020-168574 dated Sep. 13, 2023.

* cited by examiner

DECORATIVE SHEET AND ELECTROSTATIC INPUT DEVICE

CROSS-REFERENCE TO RELATED APPLICATION

This application is a continuation application of International Application No. PCT/JP2020/010564 filed on Mar. 11, 2020, and designating the U.S., which is based upon and claims priority to Japanese Patent Application No. 2019-123193, filed on Jul. 1, 2019, the entire contents of which are incorporated herein by reference.

BACKGROUND

1. Field of the Invention

The present invention relates to a decorative sheet and an electrostatic input device.

2. Description of the Related Art

Conventionally, a technique, in which a forming method of a three-dimensional coating formation (a three dimension overlay method (TOM) formation) is used to attach decorative sheets to surfaces of decoration target parts having three-dimensional shapes in various parts (e.g., an inner panel) of a vehicle, so that various decorative patterns decorate the surfaces of the decoration target parts (e.g., a metal pattern, a wood grain pattern, and the like) while protecting the surfaces of the decoration target parts, is used.

With respect to such a decorative sheet, Patent Document 1 described below discloses a technique in which light emitted from a light source disposed on the back side of the decorative sheet is transmitted through a light transmitting portion having a predetermined shape formed on a light shield layer so that an optical image having a predetermined shape can be displayed on the surface of the decorative sheet.

RELATED ART DOCUMENTS

Patent Documents

Patent Document 1: Japanese Laid-Open Patent Publication No. 2001-347539

SUMMARY

According to one aspect of the present disclosure, a decorative sheet of an embodiment is a decorative sheet to be attached to a surface of a decoration target part, and includes a base film layer formed of a base film having a sheet shape, a decorative layer representing a decorative pattern, a light shield layer that is provided on a back side position with respect to the decorative layer and that has a light transmitting portion having a predetermined shape, and a medium color layer formed between the decorative layer and the light shield layer.

DETAILED DESCRIPTION

Because a decorative sheet having a configuration of the related art uses a black ink for the light shield layer, the outline of the light transmitting portion for displaying the optical image is visible through the decorative sheet from the front side of the decorative sheet while the optical image is not displayed, and this may affect the design quality of the decoration target part.

According to at least one embodiment of the disclosure, a decorative sheet, in which, while the optical image is not displayed, the outline of the light transmitting portion for displaying the optical image can be made less visible from the surface, can be provided.

In the following, embodiments will be described with reference to the drawings.

First Embodiment (Overview of an Electrostatic Input Device 10)

Figure 1A:
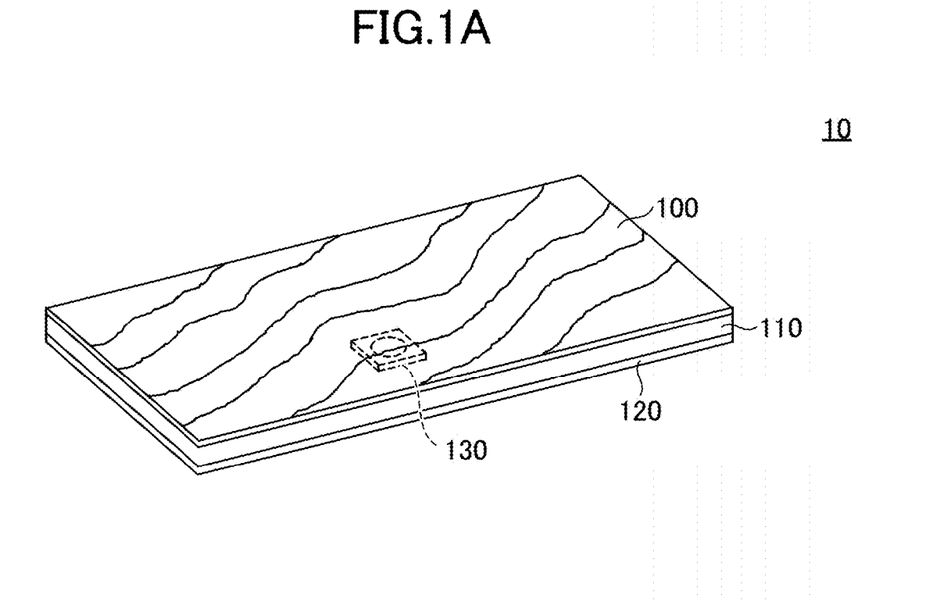
FIG. 1A and FIG. 1B are external perspective views of an electrostatic input device according to a first embodiment.
Figure 1B:
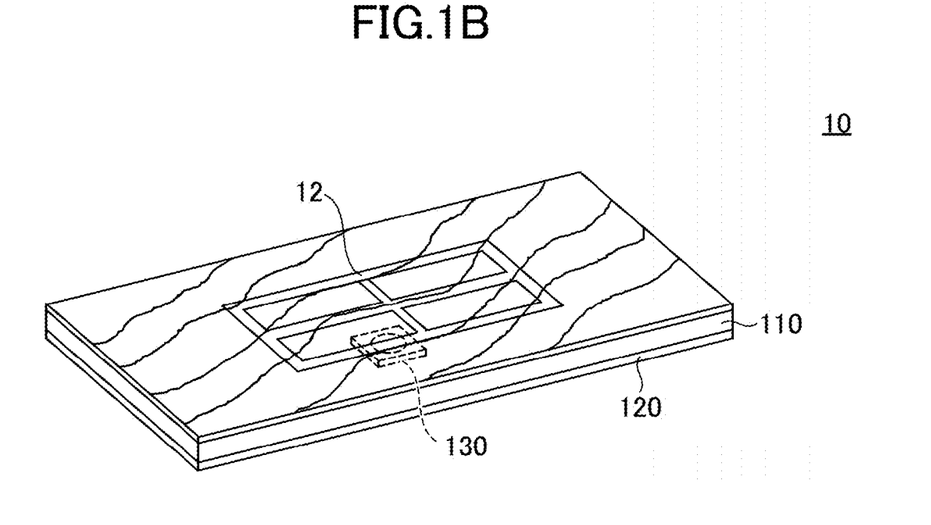

FIG. 1A and FIG. 1B are external perspective views of an electrostatic input device 10 according to a first embodiment. FIG. 1A illustrates a state in which an optical image 12 is not displayed on the surface of the electrostatic input device 10. FIG. 1B illustrates a state in which the optical image 12 is displayed on the surface of the electrostatic input device 10.

Figure 2:
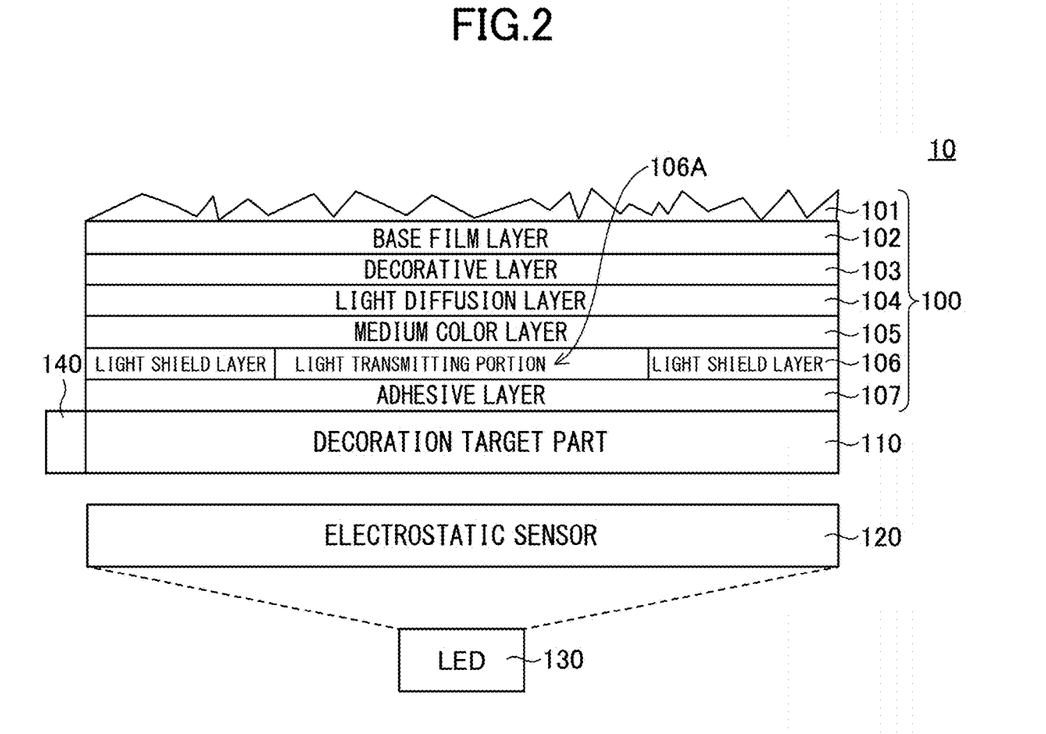
FIG. 2 is a drawing schematically illustrating a configuration of the electrostatic input device according to the first embodiment

As illustrated in FIG. 1A, FIG. 1B, and FIG. 2, the electrostatic input device 10 includes a decorative sheet 100, a decoration target part 110, an electrostatic sensor 120, an LED 130, and a piezoelectric vibrating element 140.

The decorative sheet 100 is a member having a sheet shape, and a decorative pattern (e.g., a wood grain pattern, a metal pattern, or the like) is applied to the surface of the member. The decorative sheet 100 decorates the surface of the decoration target part 110 by being attached to the surface of any decoration target part 110 (e.g., an interior panel of a car or the like).

The electrostatic sensor 120 is disposed on the back side of the decoration target part 110. The electrostatic sensor 120 can detect a contact position of an operation body (e.g., an operator's finger) with respect to the surface of the decoration target part 110. This allows the electrostatic sensor 120 to receive an operation input in accordance with a contact position of an operator.

The LED 130 is an example of a "light source" and is disposed on the back side of the electrostatic sensor 120. The LED 130 emits light to the decoration target part 110 at a predetermined timing. The emission timing of the LED 130 is externally controlled. The light emitted from the LED 130 is transmitted through the electrostatic sensor 120 and the decoration target part 110. Further, in the decorative sheet 100, the light emitted from the LED 130 is transmitted through the light transmitting portion 106A (see FIG. 2) having a predetermined shape. This enables the LED 130 to display the optical image 12 having a predetermined shape on the surface of the decoration target part 110, as illustrated in FIG. 1B. Here, while the LED 130 does not emit light, as illustrated in FIG. 1A, the optical image 12 is not displayed on the surface of the decoration target part 110 and thus only the decorative pattern can be viewed.

The piezoelectric vibrating element 140 is an example of a vibration generating device and is attached to the decoration target part 110. The piezoelectric vibrating element 140 can provide tactile feedback to an operator by vibrating the decoration target part 110 in response to a signal detected by the electrostatic sensor 120. Here, as the "vibration generating device", a voice coil motor, an eccentric motor, or the like may be used instead of the piezoelectric vibrating element 140.

(Configuration of the Decorative Sheet 100)

FIG. 2 is a drawing schematically illustrating a configuration of the electrostatic input device 10 according to the first embodiment. As illustrated in FIG. 2, the decorative sheet 100 includes, from the front side (the upper side in the drawing), a tactile layer 101, a base film layer 102, a decorative layer 103, a light diffusion layer 104, a medium color layer 105, a light shield layer 106, and an adhesive layer 107.

The tactile layer 101 is a layer formed on the front side (the uppermost side in the drawing) of the decorative sheet 100. In the example illustrated in FIG. 2, the tactile layer 101 is formed on the front surface (the upper surface in the drawing) of the base film layer 102. For example, the tactile layer 101 is formed to have protrusions and recesses by printing a transparent color ink multiple times to be laminated through thermal transfer printing using a thermal transfer printer. This allows the tactile layer 101 to impart a tactile feeling to an operating body (e.g., a human hand, a human finger, or the like) that contacts the surface of the decorative sheet 100. The tactile layer 101 is formed to have protrusions and recesses corresponding to a decorative pattern formed in the decorative layer 103, thereby imparting a tactile feeling closer to a material (e.g., wood, a metal, or the like) that is artificially represented by the decorative pattern.

The base film layer 102 is a layer formed by a base film serving as a base of the decorative sheet 100. That is, the decorative sheet 100 is formed by laminating other layers on the base film layer 102. For example, the base film layer 102 may be formed by using a flexible transparent sheet of a resin material (e.g., polymethyl methacrylate (PMMA), urethane, polyethylene terephthalate (PET), or the like). In the present embodiment, the base film layer 102 that is transparent and has a smooth surface is disposed on the front surface of the decorative layer 103. Thus, in the present embodiment, the base film layer 102 also functions as a protective layer to protect the front surface of the decorative layer 103.

The decorative layer 103 represents a decorative pattern (e.g., a wood grain pattern, a metal pattern, or the like) presented by the decorative sheet 100. In the example illustrated in FIG. 2, the decorative layer 103 is formed on the back surface (a lower surface in the drawing) of the base film layer 102. For example, the decorative layer 103 is formed by printing multiple color inks (e.g., CMYK) on the back surface of the base film layer 102 in units of pixels by thermal transfer printing using a thermal transfer printer, corresponding to the pattern presented by the decorative sheet 100. Here, in the present embodiment, a non-conductive ink is used to form the decorative layer 103.

The light diffusion layer 104 is provided on the back side position with respect to the decorative layer 103. The light diffusion layer 104 diffuses the light emitted from the LED 130 so that the optical image 12 produces light uniformly. For example, the light diffusion layer 104 is formed by uniformly printing a white ink on the back surface of the decorative layer 103 by thermal transfer printing using a thermal transfer printer.

The medium color layer 105 is provided between the decorative layer 103 and the light shield layer 106. While the optical image 12 is not displayed, the medium color layer 105 causes the outline of the light transmitting portion 106A of the light shield layer 106 that is a layer lower than the medium color layer 105 to be less noticeable. For example, the medium color layer 105 is formed by uniformly printing any medium color ink on the back surface of the light diffusion layer 104 by thermal transfer printing using a thermal transfer printer. Here, in the present embodiment, a gray-based color ink or a metallic ink is used as a preferable example of the medium color ink found by the inventors of the present invention. Particularly, in the present embodiment, a non-conductive gray-based color ink or a metallic ink (e.g., an In metallic ink, an Sn metallic ink, or the like) is used as the medium color ink to prevent the contact detecting function of the electrostatic sensor 120 from being affected. However, an ink used for the medium color layer 105 is not limited to this. Any color ink may be used as long as the outline of the light transmitting portion 106A of the light shield layer 106 can be less noticeable.

The light shield layer 106 is provided on the back side position with respect to the decorative layer 103. The light shield layer 106 partially transmits the light emitted from the LED 130 to display the optical image 12 having a predetermined shape on the surface of the electrostatic input device 10. Thus, the light transmitting portion 106A having an opening shape substantially the same as the shape of the optical image 12 is provided in the light shield layer 106. For example, the light shield layer 106 is formed by printing a light shielding ink (e.g., a black ink) on a portion other than the light transmitting portion 106A on the lower side of the medium color layer 105 by thermal transfer printing. Particularly, in the present embodiment, the light shield layer 106 is formed by using a light shielding and non-conductive ink in order to prevent the contact detecting function of the electrostatic sensor 120 from being affected.

The adhesive layer 107 is a layer formed on the back side (the lowermost side of the drawing) of the decorative sheet 100 so that the decorative sheet 100 can be attached to the surface of the decoration target part. In the present embodiment, the adhesive layer 107 is formed on the lower side of the light shield layer 106. For example, the adhesive layer 107 is formed by using an adhesive such as an optical clear adhesive (OCA).

The decorative sheet 100 configured as described above is attached to the surface of the decoration target part 110 by, for example, TOM molding. The TOM molding is a molding method in which the decorative sheet 100 is arranged in a box in a vacuum state so as to partition the box into an upper space and a lower space, the decoration target part 110 is pressed against the adhesive surface of the decorative sheet 100 from the lower space in a state in which the decorative sheet 100 is softened by heating the decorative sheet 100, and then the decorative sheet 100 is attached to the surface of the decoration target part 110 by pressing the surface of the decorative sheet 100 from the upper space with air or compressed air while forming a shape along the surface of the decoration target part 110.

(Configuration of the Tactile Layer 101)

Figure 3:
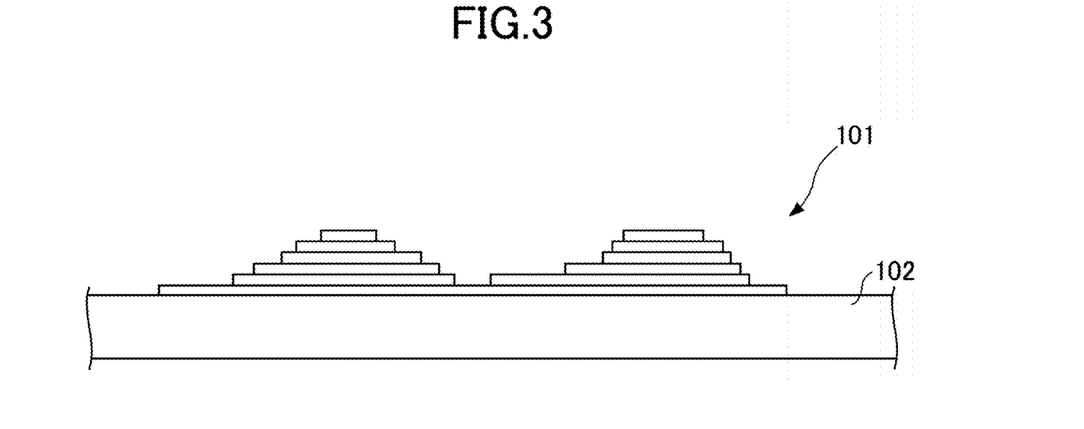
FIG. 3 is a partially enlarged view of a tactile layer provided by the decorative sheet according to the first embodiment.

FIG. 3 is a partially enlarged view of the tactile layer 101 provided by the decorative sheet 100 according to the first embodiment. As illustrated in FIG. 3, the tactile layer 101 is formed to have protrusions and recesses corresponding to the decorative pattern (e.g., a wood grain pattern) formed on the decorative layer 103 by printing the transparent ink multiple times to be laminated with respect to the front surface (the upper surface in the drawing) of the base film layer 102 by thermal transfer printing.

This allows the tactile layer 101 to impart, to the operator, a tactile feeling closer to a material (e.g., wood or the like) that is artificially represented by the decorative pattern. Because the tactile layer 101 is formed three-dimensionally, visual material feeling closer to the actual material can be achieved.

In the present embodiment, the tactile layer 101 is formed by using a transparent color ink. With this configuration of the tactile layer 101, a decrease in the visibility of the decorative pattern formed on the decorative layer 103 that is on the back side position with respect to the tactile layer 101 can be suppressed.

However, the tactile layer 101 may be formed by using, for example, a matte ink, a silver ink, a color ink, or the like, as well as a transparent color ink. This allows the tactile layer 101 to achieve a visual material feeling closer to the actual material.

With respect to the tactile layer 101, any color ink may be used for each ink layer. That is, the tactile layer 101 can have different ink colors in multiple ink layers.

Each ink layer is formed by a thermal transfer printer heating an ink ribbon coated on a film at a suitable position and transferring the ink at the suitable position to the base film layer 102. The thickness of each ink layer is determined in accordance with the type of ink used for that ink layer (e.g., about 0.5 to 5 μm).

As described above, the decorative sheet 100 according to the first embodiment includes the base film layer 102 formed of a base film having a sheet shape, the decorative layer 103 representing a decorative pattern, the light shield layer 106 that is disposed on the back side position with respect to the decorative layer 103 and that has the light transmitting portion 106A having a predetermined shape, and the medium color layer 105 formed between the decorative layer 103 and the light shield layer 106.

The decorative sheet 100 according to the first embodiment includes the medium color layer 105, so that while the optical image 12 is not displayed (that is, while the LED 130 does not emit light), the outline of the light transmitting portion 106A of the light shield layer 106 can be made less visible from the front side of the decorative sheet 100.

Additionally in the decorative sheet 100 according to the first embodiment, the medium color layer 105 is formed by using an ink having a gray-based color or a metallic ink.

Thus, in the decorative sheet 100 according to the first embodiment, while the optical image 12 is not displayed, the outline of the light transmitting portion 106A provided by the light shield layer 106 can be made less visible from the front side of the decorative sheet 100.

Additionally, the decorative sheet 100 according to the first embodiment further includes the tactile layer 101 formed to have protrusions and recesses on the front side of the decorative sheet 100 by printing an ink multiple times.

Thus, the decorative sheet 100 according to the first embodiment can impart, to an operator (e.g., a human hand, a human finger, or the like) that contacts the surface of the decorative sheet 100, a tactile feeling closer to a material (e.g., wood, a metal, or the like) artificially represented by the decorative pattern of the decorative layer 103.

Additionally, in the decorative sheet 100 according to the first embodiment, the tactile layer 101 is formed by using a transparent color ink.

With this configuration, the decorative sheet 100 according to the first embodiment can suppress the decrease in the visibility of the decorative pattern of the decorative layer 103 due to the tactile layer 101 being provided.

Additionally, in the decorative sheet 100 according to the first embodiment, the decorative layer 103 (and the light diffusion layer 104, the medium color layer 105, and the light shield layer 106) is formed on the back surface of the base film layer 102, and the tactile layer 101 is formed on the front surface of the base film layer 102.

Thus, in the decorative sheet 100 according to the first embodiment, the decorative layer 103 (and the light diffusion layer 104, the medium color layer 105, and the light shield layer 106) can be protected by the base film layer 102, thereby increasing the durability of the decorative layer 103 (and the light diffusion layer 104, the medium color layer 105, and the light shield layer 106).

Additionally, in the decorative sheet 100 according to the first embodiment, each of the decorative layer 103, the medium color layer 105, and the light shield layer 106 is formed by using a non-conductive ink.

This allows the decorative sheet 100 according to the first embodiment to prevent each of the decorative layer 103, the medium color layer 105, and the light shield layer 106 from affecting the contact detecting function of the electrostatic sensor 120 when the configuration of disposing the electrostatic sensor 120 on the back side of the decorative sheet 100 is employed.

Second Embodiment (Configuration of a Decorative Sheet 100A)

Figure 4:
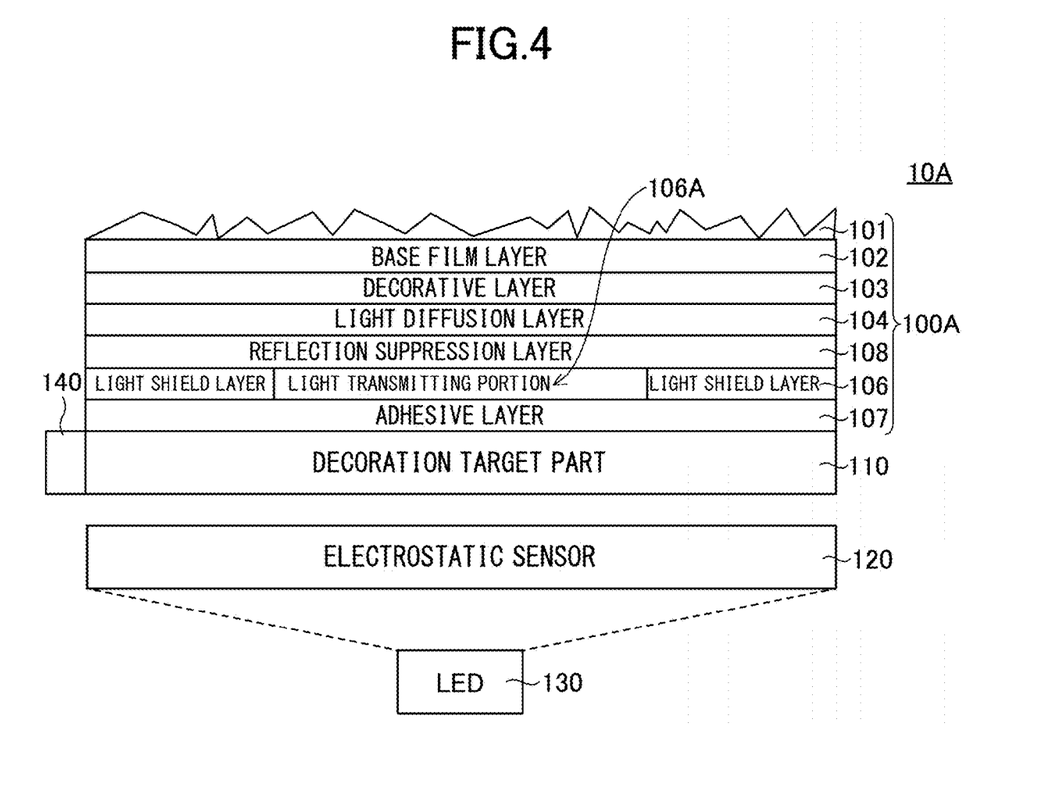
FIG. 4 is a drawing schematically illustrating a configuration of an electrostatic input device according to a second embodiment.

FIG. 4 is a drawing schematically illustrating a configuration of an electrostatic input device 10A according to a second embodiment. In the following, with respect to the electrostatic input device 10A according to the second embodiment, changes from the electrostatic input device 10 according to the first embodiment will be described.

The electrostatic input device 10A according to the second embodiment is different from the electrostatic input device 10 according to the first embodiment in that a decorative sheet 100A is provided instead of the decorative sheet 100.

As illustrated in FIG. 4, the decorative sheet 100A includes, from the front surface side (the upper side in the drawing), the tactile layer 101, the base film layer 102, the decorative layer 103, the light diffusion layer 104, a reflection suppression layer 108, the light shield layer 106, and the adhesive layer 107. That is, the decorative sheet 100A differs from the decorative sheet 100 according to the first embodiment in that the decorative sheet 100A includes the reflection suppression layer 108 instead of the medium color layer 105.

The reflection suppression layer 108 is provided between the decorative layer 103 and the light shield layer 106. While the optical image 12 is displayed, the reflection suppression layer 108 suppresses reflection of the decorative pattern formed in a position overlapping the optical image 12, with respect to the optical image 12. Thus, an inverted image (an example of a "reflection suppression image") of the decorative pattern of the decorative layer 103 is formed by thermal transfer printing using a thermal transfer printer on the back surface of the light diffusion layer 104 to form the reflection suppression layer 108. The inverted image is obtained by inverting the density for each pixel of the original image. In the present embodiment, as a preferable example of the inverted image of the decorative pattern found by the inventors of the present invention, a black-and-white image or a color image using a complementary color of the decorative pattern is used.

(Examples of the Decorative Layer 103 and the Reflection Suppression Layer 108)

Figure 5A:
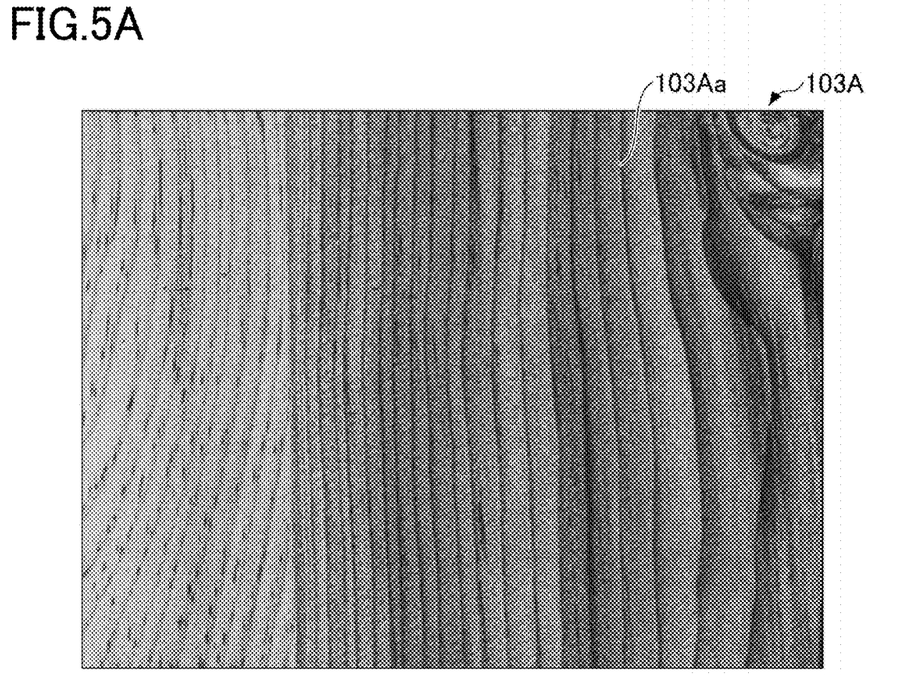
FIG. 5A and FIG. 5B are drawings illustrating examples of a decorative layer and a reflection suppression layer formed in the decorative sheet according to the second embodiment.
Figure 5B:
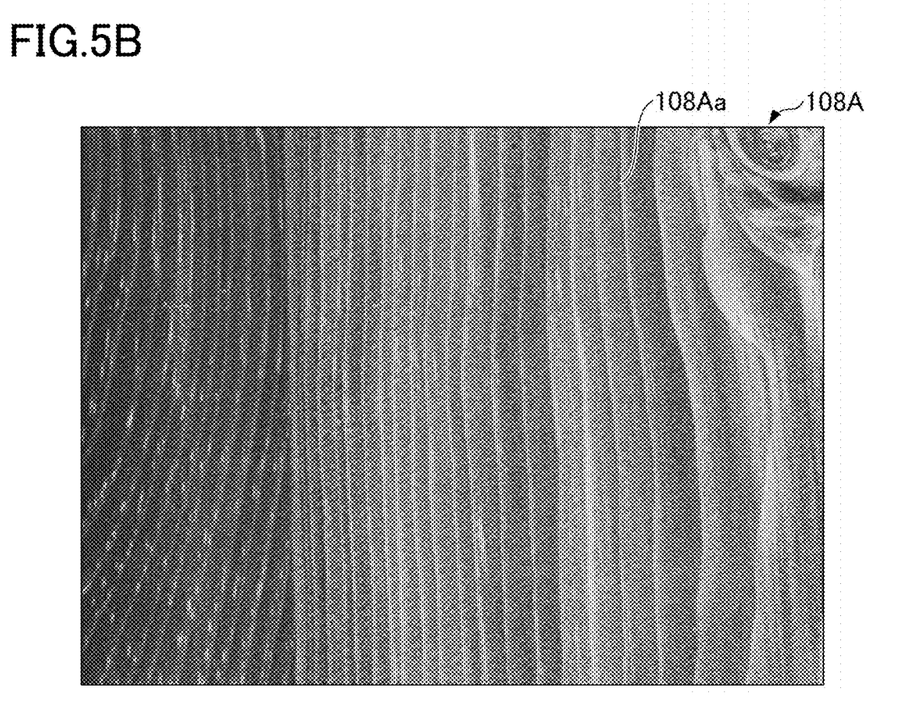

FIG. 5A and FIG. 5B are drawings illustrating examples of the decorative layer 103 and the reflection suppression layer 108 formed in the decorative sheet 100A according to the second embodiment. FIG. 5A illustrates the example of the decorative pattern 103A formed on the decorative layer 103 in the decorative sheet 100A according to the second embodiment. FIG. 5B illustrates the example of an inverted image 108A formed on the reflection suppression layer 108 in the decorative sheet 100A according to the second embodiment.

As illustrated in FIG. 5A, the decorative pattern 103A of the decorative layer 103 has a wood grain pattern. With respect to this, as illustrated in FIG. 5B, the inverted image 108A of the reflection suppression layer 108 has a wood grain pattern similar to the decorative pattern 103A, but a color that is inverted from the decorative pattern 103A is used. Therefore, for example, the wood grain 103Aa represented in a dark color in the decorative pattern 103A illustrated in FIG. 5A is represented by the wood grain 108Aa in a light color in the inverted image 108A illustrated in FIG. 5B.

With this configuration, while the optical image 12 is displayed, the decorative sheet 100A according to the second embodiment can make the wood grain 103Aa (the dark color) of the decorative pattern 103A formed in the position overlapping the optical image 12 less visible from the front surface side of the decorative sheet 100A by providing the wood grain 108Aa (the light color) of the inverted image 108A formed in the same position.

Here, it is preferable that at least the inverted image 108A is capable of suppressing the reflection of the wood grain 103Aa with respect to the optical image 12. For example, the wood grain 108Aa alone may be printed.

(Comparative Example)

Figure 6A:
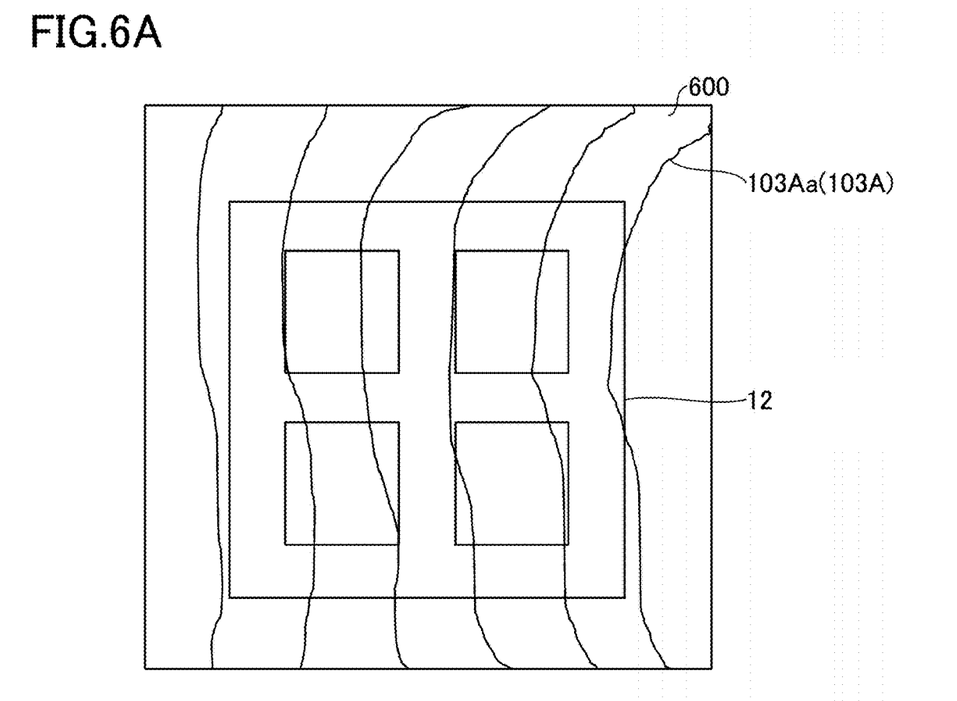
FIG. 6A and FIG. 6B are drawings illustrating a comparative example of the decorative sheet according to the second embodiment.
Figure 6B:
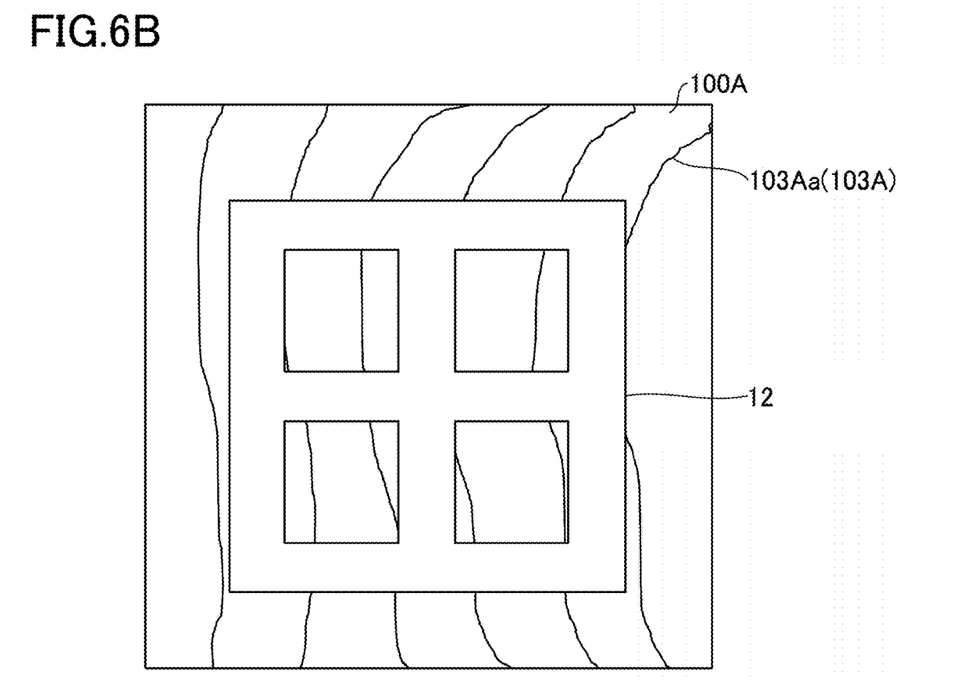

FIG. 6A and FIG. 6B are drawings illustrating one comparative example of the decorative sheet 100A according to the second embodiment. In the present comparative example, a decorative sheet, in which the reflection suppression layer 108 is removed from the decorative sheet 100A according to the second embodiment, is used as the decorative sheet 600 of the related art.

FIG. 6A illustrates a partially enlarged view of the decorative sheet 600 of the related art (the lighting portion of the optical image 12) in a state in which the optical image 12 is lit. FIG. 6B illustrates a partially enlarged view of the decorative sheet 100A (the lighting portion of the optical image 12) according to the second embodiment in a state in which the optical image 12 is lit.

As illustrated in FIG. 6A, in the decorative sheet 600 of the related art, while the optical image 12 is lit, the wood grain 103Aa of the decorative pattern 103A formed in the position overlapping the optical image 12 is easily viewed. With respect to this, as illustrated in FIG. 6B, in the decorative sheet 100A according to the second embodiment, while the optical image 12 is lit, the wood grain 103Aa of the decorative pattern 103A formed in the position overlap-ping the optical image 12 is less visible by providing the reflection suppression layer 108.

As described above, the decorative sheet 100A according to the second embodiment includes the base film layer 102 formed of a base film having a sheet shape, the decorative layer 103 representing the decorative pattern, the light shield layer 106 that is provided on the back side position with respect to the decorative layer 103 and that has the light transmitting portion 106A having a predetermined shape, and the reflection suppression layer 108 that represents an inverted image of the decorative pattern and that is formed between the decorative layer 103 and the light shield layer 106.

The decorative sheet 100A according to the second embodiment includes the reflection suppression layer 108, so that while the optical image 12 is displayed (that is, while the LED 130 emits light), the decorative pattern of the decorative layer 103 formed at the position overlapping the optical image 12 can be made less visible from the front side of the decorative sheet 100A.

Additionally, in the decorative sheet 100A according to the second embodiment, the reflection suppression layer 108 is formed by using a black-and-white image or a color image using a complementary color of the decorative pattern as the inverted image.

Thus, in the decorative sheet 100A according to the second embodiment, while the optical image 12 is displayed, the decorative pattern of the decorative layer 103 formed at the position overlapping the optical image 12 can be made less visible from the front side of the decorative sheet 100A.

Additionally, the decorative sheet 100A according to the second embodiment further includes the tactile layer 101 formed to have protrusions and recesses on the front side of the decorative sheet 100A by printing an ink multiple times.

Thus, the decorative sheet 100A according to the second embodiment can impart, to an operator (e.g., a human hand, a human finger, or the like) that contacts the surface of the decorative sheet 100A, a tactile feeling closer to a material (e.g., wood, a metal, or the like) artificially represented by the decorative pattern of the decorative layer 103.

Additionally, in the decorative sheet 100A according to the second embodiment, the tactile layer 101 is formed by using a transparent color ink.

With this configuration, the decorative sheet 100A according to the second embodiment can suppress the decrease in the visibility of the decorative pattern of the decorative layer 103, due to the tactile layer 101 being provided.

Additionally, in the decorative sheet 100A according to the second embodiment, the decorative pattern is a wood grain pattern.

Thus, in the decorative sheet 100A according to the second embodiment, while the optical image 12 is displayed, the wood grain pattern formed at the position overlapping the optical image 12 is made less visible from the front side of the decorative sheet 100A.

While the embodiments of the invention have been described in detail above, the invention is not limited to the embodiments, and various modifications or alterations can be made within the scope of the subject matter of the invention as recited in the appended claims.

For example, the decorative sheet of the present invention can be used for decorating interior or exterior parts of a vehicle, but is not limited thereto. The decorative sheet of the present invention can be used for any decoration target part. Additionally, the decorative sheet of the present invention can be used for not only a decoration target part provided with an electrostatic sensor but also a decoration target part provided without an electrostatic sensor.

Additionally, the decorative sheet of the present invention may include both the medium color layer described in the first embodiment and the reflection suppression layer described in the second embodiment. In this case, the decorative sheet can have both the effect that the outline of the light transmitting portion of the light shield layer can be made less visible, and the effect that the decorative pattern formed in the position overlapping the optical image can be made less visible.

Additionally, the decorative sheet of the invention may further include any other layer (e.g., a color filter layer that is totally or partially colored relative to the optical image 12 and the like) in addition to the configuration described in each embodiment.

What is claimed is:

1. A decorative sheet to be attached to a surface of a decoration target part, the decorative sheet comprising:
    a base film layer formed of a base film having a sheet shape;
    a decorative layer representing a decorative pattern;
    a light shield layer provided on a back side position with respect to the decorative layer, the light shield layer including a light transmitting portion having a predetermined shape;
    a light diffusion layer that diffuses light, the light diffusion layer formed by printing a white ink on a surface of the decorative laver; and
    a medium color layer formed between the decorative layer and the light shield layer,
    wherein the medium color layer is formed by using an ink having a gray-based color, and the light diffusion layer is formed between the decorative layer and the medium color layer.

2. The decorative sheet as claimed in claim 1, further comprising a tactile layer formed to have protrusions and recesses by printing an ink multiple times on a front side of the decorative sheet.

3. The decorative sheet as claimed in claim 2, wherein the tactile layer is formed by using a transparent color ink.

4. The decorative sheet as claimed in claim 2, wherein the decorative layer is formed on a back surface of the base film layer and the tactile layer is formed on a front surface of the base film layer.

5. The decorative sheet as claimed in claim 1, wherein each of the decorative layer, the medium color layer, and the light shield layer is formed by using a non-conductive ink.

6. The decorative sheet as claimed in claim 1, wherein the light diffusion layer is formed uniformly by printing the white ink on the surface of the decorative layer.

7. An electrostatic input device comprising:
    the decorative sheet as claimed in claim 1; and
    an electrostatic sensor disposed on a back side of the decorative sheet.

8. The electrostatic input device as claimed in claim 7, further comprising a light source disposed on the back side of the decorative sheet, the light source being configured to emit light to the decorative sheet.

9. A decorative sheet to be attached to a surface of a decoration target part, the decorative sheet comprising:
    a base film 1a Ter formed of a base film having a sheet shape;
    a decorative layer representing a decorative pattern;
    a light shield layer provided on a back side position with respect to the decorative layer, the light shield layer including a light transmitting portion having a predetermined shape;
    a light diffusion layer that diffuses light, the light diffusion layer formed by printing a white ink on a surface of the decorative layer; and
    a medium color layer formed between the decorative layer and the light shield layer, wherein the medium color layer is formed by using a metallic ink, and the light diffusion layer is formed between the decorative layer and the medium color layer.

10. The decorative sheet as claimed in claim 9, wherein the medium color layer is formed by using an In metallic ink or an Sn metallic ink.

* * * * *